United States Patent
Wise et al.

(10) Patent No.: US 10,691,109 B2
(45) Date of Patent: Jun. 23, 2020

(54) SYSTEM AND METHOD USING ROBOTS TO ASSIST HUMANS IN ORDER FULFILLMENT

(71) Applicants: Melonee Wise, San Jose, CA (US); Michael Ferguson, San Jose, CA (US)

(72) Inventors: Melonee Wise, San Jose, CA (US); Michael Ferguson, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 0 days.

(21) Appl. No.: 16/549,637

(22) Filed: Aug. 23, 2019

(65) Prior Publication Data

US 2020/0019144 A1    Jan. 16, 2020

Related U.S. Application Data

(62) Division of application No. 16/196,306, filed on Nov. 20, 2018, now Pat. No. 10,562,707, which is a division of application No. 15/512,058, filed on Mar. 16, 2017.

(60) Provisional application No. 62/115,440, filed on Feb. 12, 2015, provisional application No. 62/117,457, filed on Feb. 18, 2015.

(51) Int. Cl.
| | |
|---|---|
| *G05B 19/418* | (2006.01) |
| *G06Q 10/08* | (2012.01) |
| *G05B 19/00* | (2006.01) |
| *G06F 7/00* | (2006.01) |

(52) U.S. Cl.
CPC ......... *G05B 19/418* (2013.01); *G06Q 10/087* (2013.01); *G05B 19/00* (2013.01); *G06F 7/00* (2013.01)

(58) Field of Classification Search
CPC .................................. B65G 1/137; G06F 7/00
USPC .............................................. 705/28; 700/218
See application file for complete search history.

(56) References Cited

U.S. PATENT DOCUMENTS

| | | | | |
|---|---|---|---|---|
| 9,463,927 B1 * | 10/2016 | Theobald | .............. | B65G 1/1373 |
| 9,465,390 B2 * | 10/2016 | Mason | .................. | G05D 1/0291 |
| 9,466,046 B1 * | 10/2016 | Theobald | .............. | G06Q 10/087 |
| 9,519,882 B2 * | 12/2016 | Galluzzo | .................. | B25J 5/007 |
| 9,550,624 B2 * | 1/2017 | Khodl | ....................... | B25J 5/007 |
| 9,636,825 B2 * | 5/2017 | Penn | ..................... | G06Q 10/083 |
| 9,694,977 B2 * | 7/2017 | Aprea | .................. | G05D 1/0289 |
| 9,785,911 B2 * | 10/2017 | Galluzzo | .................. | B25J 5/007 |
| 9,919,872 B2 * | 3/2018 | Khodl | ....................... | B25J 5/007 |
| 10,040,630 B2 * | 8/2018 | Grinnell | ............... | B65G 1/0492 |
| 10,282,696 B1 * | 5/2019 | Bettis | .................... | G06Q 10/087 |
| 10,311,400 B2 * | 6/2019 | Mascorro Medina | ....................... | G06Q 30/016 |
| 10,482,421 B1 * | 11/2019 | Ducrou | .............. | G06Q 10/0836 |
| 2006/0279531 A1 | 12/2006 | Jung et al. | | |
| 2008/0161970 A1 | 7/2008 | Adachi et al. | | |
| 2011/0295399 A1 | 12/2011 | Plociennik et al. | | |

(Continued)

*Primary Examiner* — Oluseye Iwarere
(74) *Attorney, Agent, or Firm* — J. Steven Svboda

(57) ABSTRACT

A system using one or more robots to assist a human in order fulfillment includes: a server configured to receive an order comprising an order item; inventory storage operationally connected to the server, the inventory storage comprising inventory items; an order robot operationally connected to the server, the order robot configured to assist a human to pick an order item from the inventory items; and a human-operated device operably connected to one or more of the server, the inventory storage, and the order robot, the human-operated device configured to assist the human to pick the order item.

20 Claims, 19 Drawing Sheets

(56) References Cited

U.S. PATENT DOCUMENTS

| | | | |
|---|---|---|---|
| 2013/0317642 A1 | 11/2013 | Asaria et al. | |
| 2015/0032252 A1* | 1/2015 | Galluzzo | B25J 5/007 |
| | | | 700/218 |
| 2015/0073589 A1* | 3/2015 | Khodl | B25J 5/007 |
| | | | 700/218 |
| 2015/0332213 A1* | 11/2015 | Galluzzo | B25J 5/007 |
| | | | 700/216 |
| 2015/0375398 A1* | 12/2015 | Penn | G06Q 10/083 |
| | | | 700/218 |
| 2016/0101940 A1* | 4/2016 | Grinnell | B65G 1/0492 |
| | | | 700/216 |
| 2017/0088355 A1* | 3/2017 | Khodl | B25J 5/007 |
| 2017/0297820 A1* | 10/2017 | Grinnell | G06Q 10/087 |
| 2018/0075403 A1* | 3/2018 | Mascorro Medina | |
| | | | G06Q 30/016 |
| 2018/0141755 A1* | 5/2018 | Khodl | B25J 5/007 |
| 2020/0019144 A1* | 1/2020 | Wise | G06Q 10/087 |

* cited by examiner

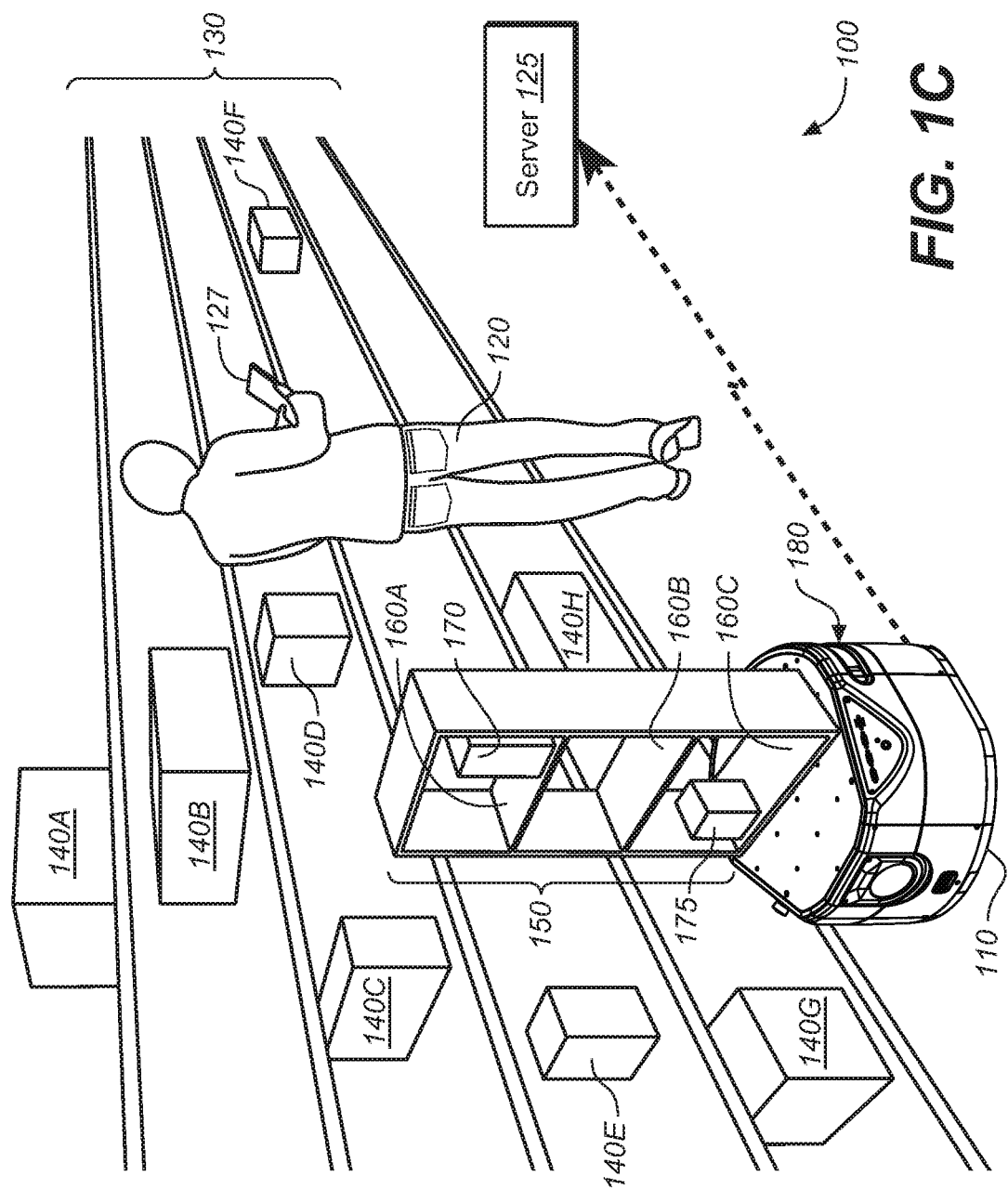

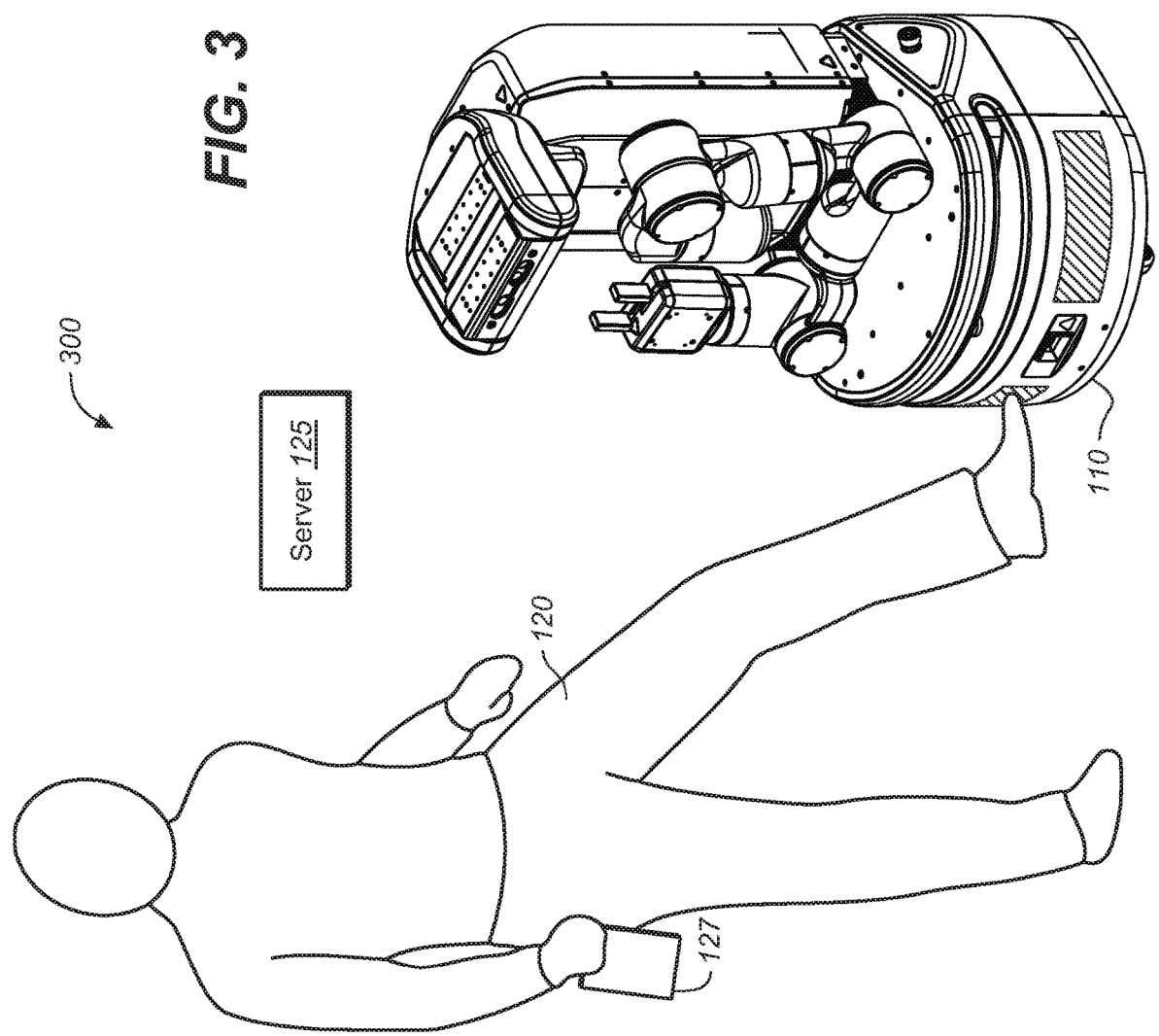

SYSTEM AND METHOD USING ROBOTS TO ASSIST HUMANS IN ORDER FULFILLMENT

PRIORITY CLAIM

The present application claims the priority benefit of U.S. provisional patent application No. 62/115,440 filed Feb. 12, 2015 and entitled "System and Method for Order Fulfillment and Inventory Management Using Robots," and of U.S. provisional patent application No. 62/117,457 filed Feb. 18, 2015 and entitled "System and Method for Order Fulfillment Using Robots to Assist in Selecting Stock Items," the disclosures of which are incorporated herein by reference.

CROSS-REFERENCE TO RELATED APPLICATIONS

This application contains subject matter that is related to the subject matter of the following applications, which are assigned to the same assignee as this application. The below-listed applications are hereby incorporated herein by reference in its entirety:

"SYSTEM AND METHOD FOR ORDER FULFILLMENT USING ROBOTS," by Wise, et al., co-filed herewith.

SUMMARY

Embodiments of this invention relate in general to inventory management and order fulfillment systems, and more particularly to a system and method using robots to assist humans in order fulfillment.

A system using one or more robots to assist a human in order fulfillment includes: a server configured to receive an order comprising an order item; inventory storage operably connected to the server, the inventory storage comprising inventory items; an order robot operably connected to the server, the order robot configured to assist a human to pick an order item from the inventory items; and a human-operated device operably connected to one or more of the server, the inventory storage, and the order robot, the human-operated device configured to assist the human to pick the order item.

A method using one or more robots to assist a human in order fulfillment includes: receiving, by an order robot, a selection of the order robot by the human; receiving, by the order robot, from a server, an order comprising an order item; receiving, by the order robot, from the server, a direction to assist the human to pick the order item; receiving, by the order robot, an assist trigger configured to trigger the order robot to assist the human to pick the order item; assisting the human, by the order robot, to pick the order item; receiving, by the order robot, from the server, an instruction to carry the order item to a final destination; and carrying the order item to the final destination.

A method using one or more robots to assist a human in order fulfillment includes: receiving, by a server, an order comprising an order item; receiving, by the server, a selection by the human of the order robot; sending the order, by the server, to one or more of the order robot and a human-operated device available to the human; sending, by the server, to the order robot, a direction to assist the human to pick the order item; determining, by the server, that the order is nearly complete; determining, by the server, that an order robot replacement suitable for fulfilling a next order has not yet been sent; sending a dispatch instruction, by the server, to the order robot replacement instructing its dispatch; determining, by the server, that the order is complete; and instructing the order robot, by the server, to carry the order item to a final destination.

DESCRIPTION OF THE DRAWINGS

FIGS. 1A-1K are a set of drawings that depict a sequence of events in a system using robots to assist humans in order fulfillment in which an order robot follows one or more humans as they pick one or more order items.

FIG. 3 is a drawing of a system using robots to assist humans in order fulfillment showing that the following behavior of the order robot may be initiated by a hit such as by lightly kicking a hit detection device comprised in the order robot.

FIG. 4 is a drawing of a system using robots to assist humans in order fulfillment illustrating that the order robot can autonomously give the human cues as to one or more of what to pick, where to pick, and the like.

DETAILED DESCRIPTION

Figure 1A:
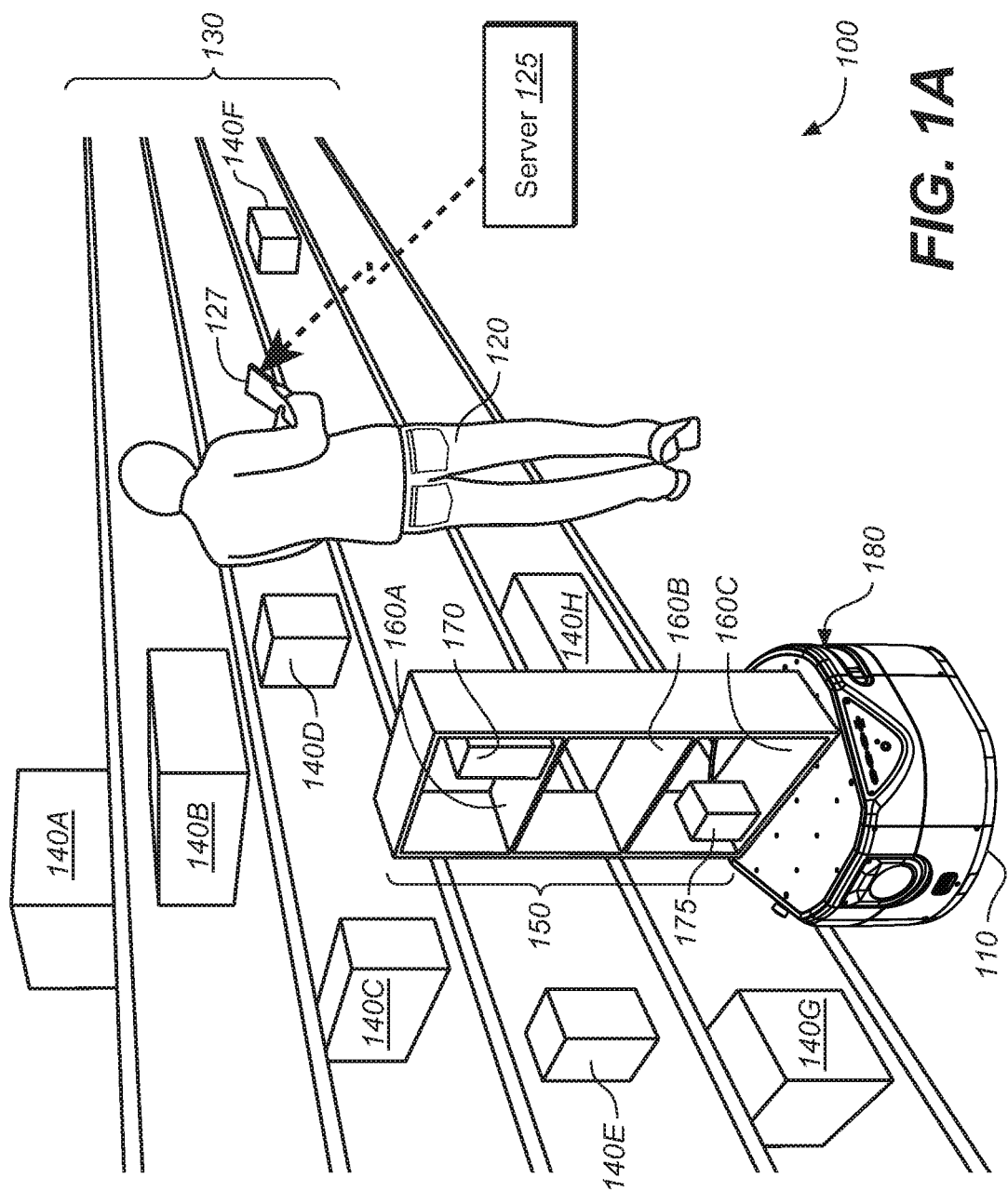

Embodiments of the invention relate in general to inventory management and order fulfillment systems, and more particularly to a system and method using robots to assist humans in order fulfillment to assist the selection of stock items to fulfill orders. More specifically, embodiments of the invention relate to a system and method using robots to assist humans in order fulfillment to assist humans picking stock items. More specifically, embodiments of the invention relate to a system and method using robots to assist humans in order fulfillment comprising a mobile base to assist humans picking stock items. More specifically, embodiments of the invention relate to a system and method using robots to assist humans in order fulfillment comprising an order robot to assist humans picking stock items.

According to embodiments of the invention, an order robot is used to transport items that a human is picking from inventory storage. For example, the order robot is used to transport stock items that a human is picking from inventory storage to fulfill an order. Inventory storage may comprise one or more of a fixed shelf, a non-fixed shelf, a rack, and another inventory storage.

For example, the order robot makes one or more information captures using one or more information capture devices, with one or more of the one or more information captures being used to perform one or more of detecting a human location and tracking motion of one or more humans. For example, the information capture device can comprise one or more of a depth camera, a Red Green Blue (RGB) camera, another type of photographic camera, a videocamera, a laser, a wireless receiver, a fiducial, a scanner, and another information capture device. For example, the information capture device comprises a laser scanner. For example, the information capture device comprises a scanning laser rangefinder. For example, the information capture can comprise one or more of a camera image, a video, a depth image, a laser measurement, and another information capture.

According to other embodiments of the invention, the system comprises a human-operated device. The human-operated device may be one or more of carried by the human, carried in clothing of the human, and placed near the human. For example, the human-operated device may be carried in a pocket comprised in one or more of a shirt worn by the human and pants worn by the human. The human-operated device comprises one or more of a heads-up display, a smart watch, a tablet, a scanner, a mobile computer, a wireless human-operated device, a headset, and another human-operated device. Preferably, although not necessarily, the human controls the human-operated device. The server may send the order to the human-operated device, and the human-operated device may receive the order, so that the order is made available to the human.

According to further embodiments of the invention, following the information capture, the order robot positions itself at an approximate distance from a human. For example, the approximate distance may be predetermined by a user. Alternatively, or additionally, following the information capture, the order robot positions itself at an approximate position. For example, following the information capture, the order robot positions itself at an approximate robot position relative to a human. For example, the robot position may be predetermined by a user. For example, the robot position comprises a point approximately located on the circumference of a circle centered at a human location of a human. For example, the robot position comprises a point approximately located on the circumference of a circle centered at a human location of a human and with a radius that is predetermined by a user. For example, the robot position comprises a point that is approximately nearest to a human of points located on the circumference of a circle centered at the human location of the human and with a radius that is predetermined by a user.

In the case where the order robot is following a human, the server can dispatch robots to one or more previously designated waiting spots. The one or more previously designated waiting spots can be near the inventory to be picked. Alternatively, or additionally, the one or more previously designated waiting spots may be located near a central staging area for robots. The order robots are configured to engage in following behavior. The order robots are configured to move from the previously designated waiting stop to a stop made by a human to pick inventory. The order robots are further configured to move from a stop made by a human to pick inventory to another stop made by a human to pick inventory.

According to an alternative set of embodiments, the mobile base may not be constrained to the plane and may fly using one or more propellers. According to another alternative set of embodiments, the order robot may move using actuated legs. According to yet another set of embodiments, the order robot may move itself by balancing on a ball.

According to a further set of embodiments, an order robot waiting spot is located near a charging station, thereby allowing the order robot to recharge its battery while waiting for the human to arrive. For example, the charging station may be a wireless charging station. For example, the charging station may be a wired charging station.

According to further embodiments of the invention, the order robot may be configured to provide data to a server. For example, the order robot may be configured to provide logging data to the server. For example, the order robot may be configured to provide logging data to a central server. For example, the order robot may be configured to provide logging data to the central server located within an inventory storage. For example, the order robot may be configured to provide the logging data to the central server that is connected to the warehouse via a network connection. The data may comprise an order item pick time, an order item pick location, an image, a point cloud, two-dimensional data, three-dimensional data, a metric, and other data.

According to another set of embodiments, the system may comprise an information capture device. For example, the order robot may comprise the information capture device. As another example, alternatively, or additionally, the server may comprise the information capture device. As yet another example, alternatively or additionally, the information capture device may be a fixed installation operably connected to the server.

For example, the information capture device may capture an image of one or more pick lists. For example, the one or more pick lists comprise one or more order items to be picked. For example, the pick lists may comprise one or more of paper pick lists, electronic pick lists and other pick lists. For example, the human presents the one or more pick lists to the order robot, which then decodes one or more order items to be picked comprised in the one or more pick lists. For example, the order robot then correlates one or more of the items to be picked with a database of product locations.

For example, the order robot leads the human through the warehouse, using one or more of the aforementioned methods of communication to tell the human what to pick. In another set of embodiments, the order robot sends to the server one or more of a coded pick list and a decoded pick list. For example, the server is connected wirelessly to a network. For example, the server is connected via a wired connection to the network. For example, the server comprises a wired server. For example, the server comprises the database of product locations. For example, the server then returns to the order robot one or more of a location and a quantity of items to be picked. For example, the server spreads the pick list among more than one order robot, thereby allowing a pick list to be spread across several humans.

FIGS. 1A-1K are a set of drawings that depict a sequence of events in a system 100 using robots 110 to assist humans 120 in order fulfillment in which an order robot 110 follows a human 120 as the human picks one or more order items. For example, the system 100 comprises a warehouse 100. Preferably, although not necessarily, the order robot 110 comprises a mobile order robot 110. Preferably, although not necessarily, the order robot 110 comprises a mobile order robot base 110.

A server 125 operably connected with the order robot 110 receives an order. The server 125 sends the order to one or more of a human-operated device 127 and the order robot 110. As shown in FIG. 1A, the server 125 sends the new order to the human-operated device 127 so as to be available to the human 120. The human-operated device 127 receives the order from the server 125. As depicted in FIG. 1A, the human-operated device 127 is held by the human 120.

The human-operated device 127 comprises one or more of a heads-up display 127, a smart watch 127, a tablet 127, a scanner 127, a mobile computer 127, a wireless human-operated device 127, a headset 127, and another human-operated device 127. For example, the scanner 127 may comprise one or more of a radio frequency (RF) scanner 127 and a radio frequency identification (RFID) reader 127. Preferably, although not necessarily, the human-operated device 127 is controlled by the human 120.

For example, the human 120 may be equipped with a headset 127 configured to communicate with the order robot 110 without picking up one or more of ambient noise and robot noise. For example, the headset 127 may be operably connected to the order robot 110. For example, the headset 127 may be operably connected to the server 125. For example, the headset 127 may be wirelessly connected to the order robot 110. For example, the headset 127 may be wirelessly connected to the server.

The order robot 110 follows the human 120 as the human 120, guided by the human-operated device 127, picks from an inventory storage 130 one or more order items 140A-140H to fulfill an order. Picking the order item 140A-140H comprises one or more of locating the order item 140A-140H, grasping the order item 140A-140H, and placing the order item 140A-140H so as to be accessible to the order robot 110. It is not intended that the terms locating, grasping, and placing be limiting. For example, grasping can occur without the human 120 exerting any effort to retain the order item 140A-140H. For example, grasping can comprise allowing the order item 140A-140H to rest on the human 120. For example, the human-operated device 127 displays one or more of the order items 140A-140H to be picked.

Those of skill in the art will recognize that any number of order robots 110 may be present according to embodiments of the invention. Similarly, those of skill in the art will recognize that any number of humans 120 may be present.

As depicted, the order robot 110 comprises order storage 150. Order storage 150 comprises one or more of an order bin, an order shelf, and an order box. As depicted, the order storage 150 comprises three order shelves, a first order shelf 160A, a second order shelf 160B, and a third order shelf 160C. As depicted, the first order shelf 160A comprises a first order shelf order item 170. As depicted, the third order shelf 160C comprises a third order shelf order item 175.

Those of skill in the art will further recognize that the first order shelf 160A may hold an arbitrary number of first order shelf order items 170, the second order shelf 160B may hold an arbitrary number of second order shelf order items (not pictured), and the third order shelf 160C may hold an arbitrary number of third order shelf order items 175.

Figure 1B:
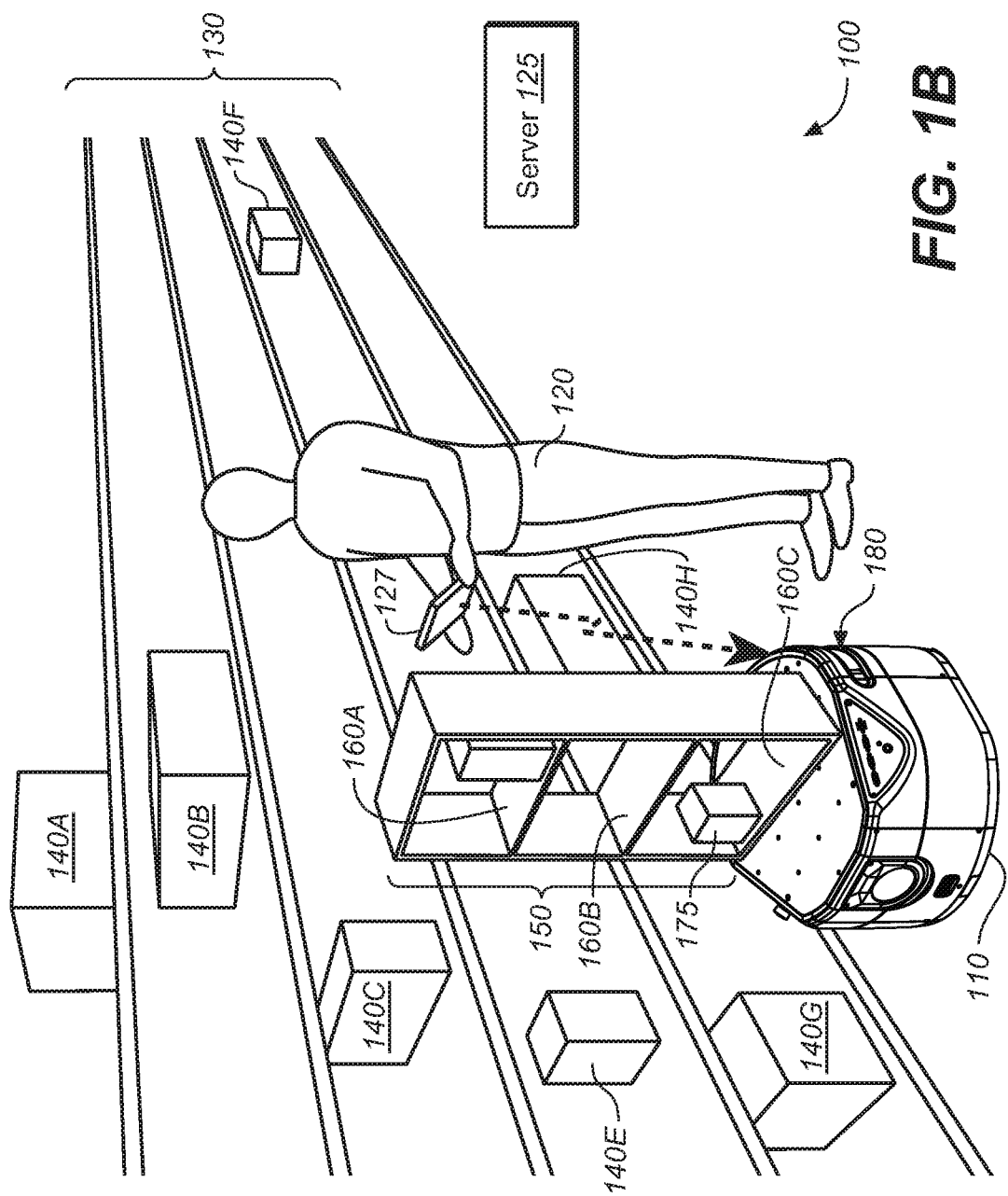

In FIG. 1B, the order robot 110 receives a selection of the order robot 110 by the human 120. As depicted, the order robot 110 comprises an information capture device 180 that receives the selection of the order robot 110 by the human 120. The information capture device 180 can comprise one or more of a depth camera, a Red Green Blue (RGB) camera, another type of photographic camera, a videocamera, a laser, a wireless receiver, a fiducial, a scanner, and another information capture device. For example, the information capture device 180 comprises one or more of a radio frequency (RF) scanner 180 and a radio frequency identification (RFID) reader 180. As depicted, the information capture device 180 comprises a laser scanner 180. For example, the laser scanner 180 comprises a scanning laser rangefinder 180. The human 120 presses a button on the human-operated device 127 to select the order robot 110 and the human-operated device 127 transmits the selection to the order robot 110.

Alternatively, the order robot 110 receives the selection via a button comprised in the order robot 110 that is pressed by the human 120. Alternatively, the human 120 designates a map location using a user interface comprised in the human-operated device 127 and the device transmits the selection to the order robot 110. Alternatively, the server 125 receives the selection from the human-operated device 127 and then the server 125 transmits the selection to the order robot 110.

In FIG. 1C, as depicted, the selected order robot 110 transmits the selection to the server 125 using the information capture device 180. Alternatively, or additionally, the human-operated device 127 transmits the selection of the order robot 110 to the server 125.

Figure 1D:
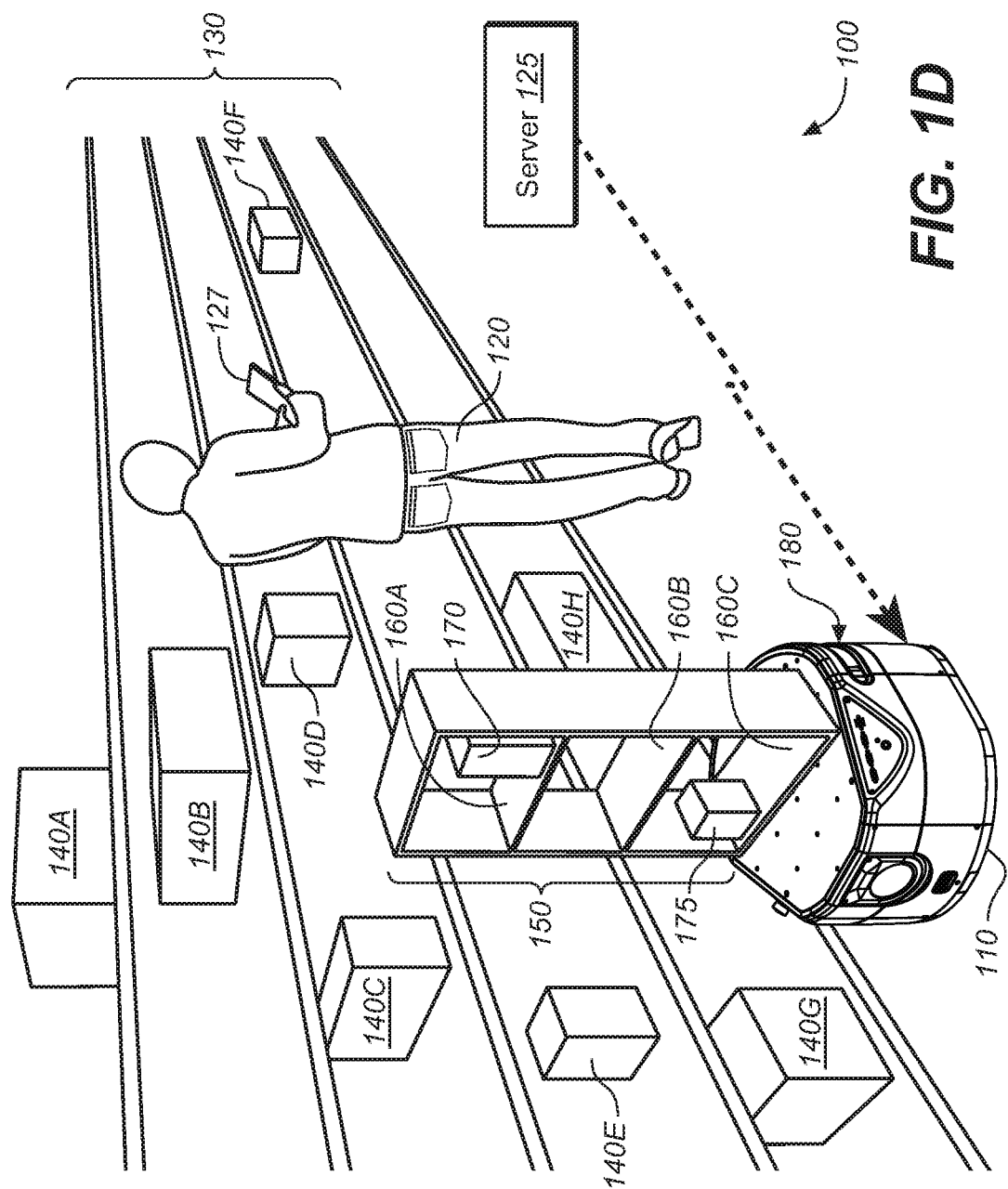

In FIG. 1D, the server 125 transmits the task to the selected order robot 110 through the information capture device 180.

Figure 1E:
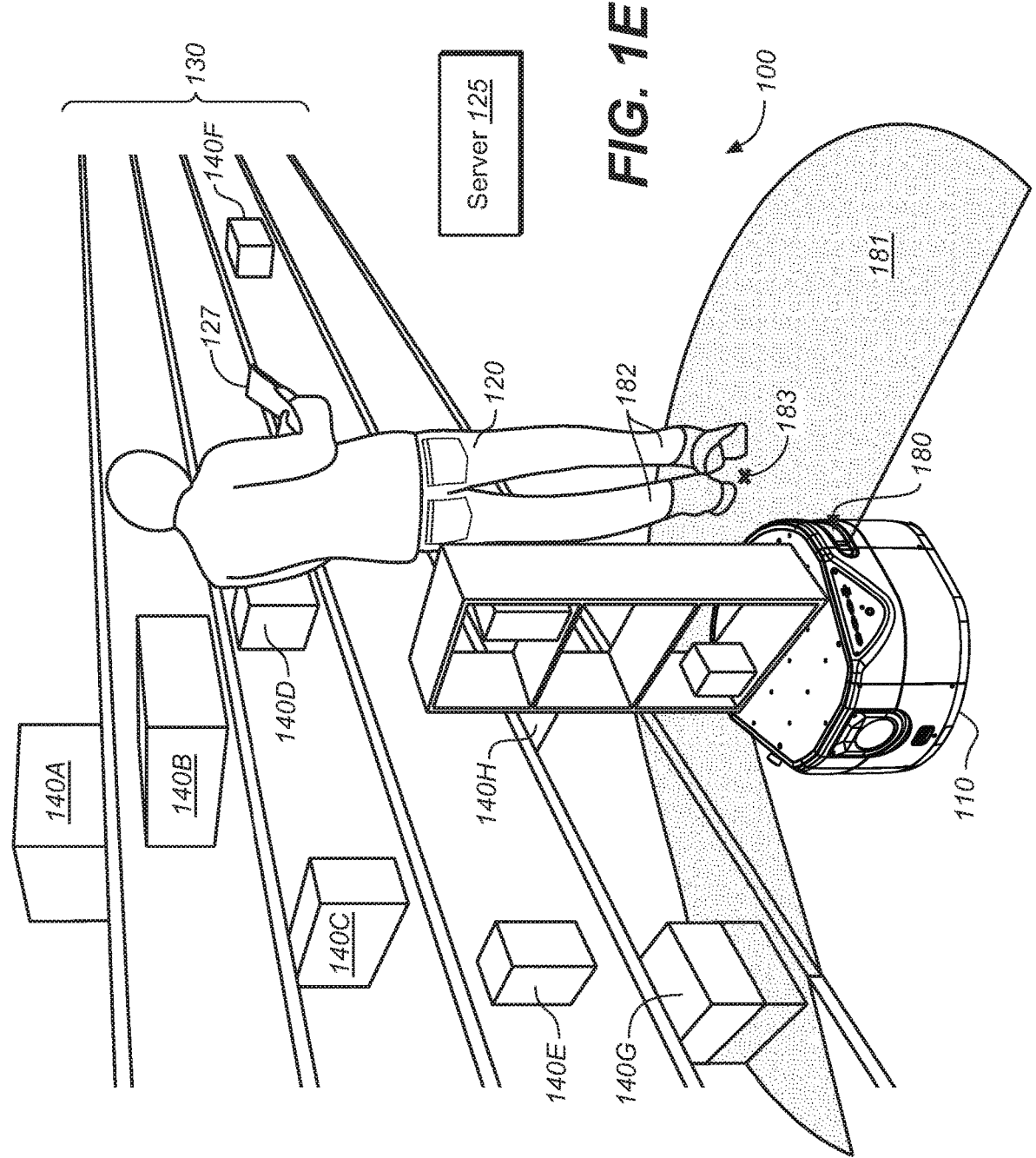

In FIG. 1E, the order robot 110 assists the human 120 in fulfilling the order. As depicted, the order robot 110 follows the human 120.

The assisting behavior of the order robot 110 may be initiated by one or more of a hit, a command, a microphone, a speech recognition system, a command from the server 125, a command from the human-operated device 127, and another assist trigger configured to trigger the order robot 110 to assist the human 120 to pick the order item.

For example, the command may comprise a spoken command. For example, the command may comprise a spoken command from the human 120. For example, the order robot 110 may comprise one or more of the microphone (not pictured) and the speech recognition system (not pictured).

As shown in FIG. 1E, the order robot 110 may use the information capture device 180 to make an information capture to perform one or more of detecting a human location and tracking a motion of the human 120. The information capture device 180 generates a sensor plane 181. As depicted, the sensor plane 181 illuminates legs 182 of the human 120 at a human location 183. Accordingly, the order robot 110 thereby performs an information capture that detects the human location 183 of the human 120.

For example, the information capture enables the order robot 110 to avoid one or more of colliding with the human 120 and losing track of the human 120. The information capture comprises one or more of a camera image, a video, a depth image, a laser measurement, and another information capture.

Figure 1F:
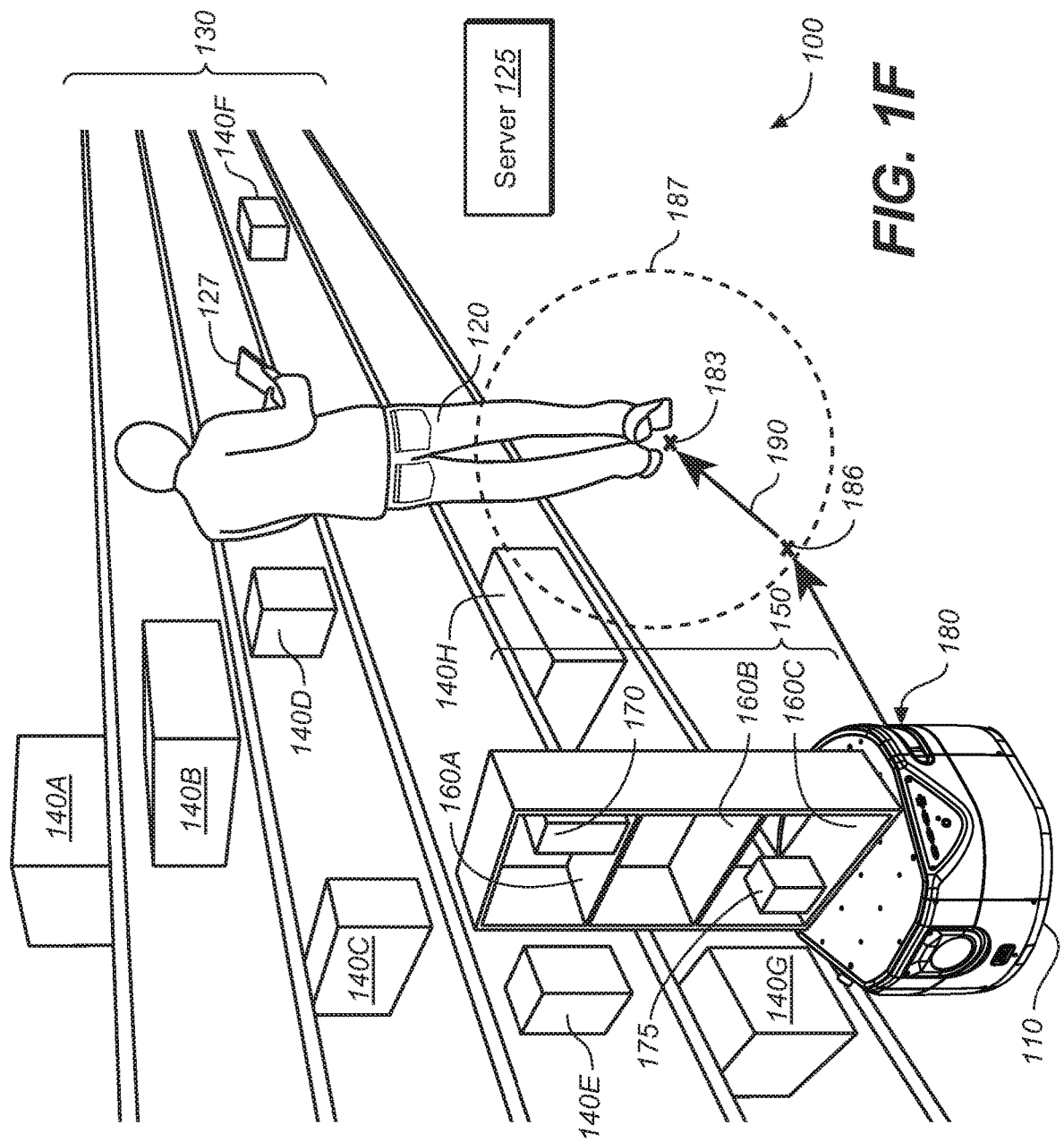

As shown in FIG. 1F, the order robot 110, using the information obtained by the information capture device 180 in the information capture, adjusts its robot position relative to the human 120. As depicted in FIG. 1F, using the information capture, the order robot 110 moves toward the human 120.

Using the information capture, the order robot 110 positions itself at an approximate robot position 186 relative to the human 120. For example, the robot position 186 may be predetermined by a user. For example, the robot position 186 comprises a point 186 that is approximately located on the circumference of a circle 187 having a radius 190 and centered at the human location 183 of the human 120. For example, the circle 187 has a radius 190 that is predetermined by a user. That is, the radius 190 comprises an approximate desired distance 190 of the order robot 110 from the human 120. As depicted, the robot position 186 comprises a point 186 that is approximately nearest to the human 120 of points located on the circumference of the circle 187 centered at the human location 183 of the human 120 and with a radius 190 that is predetermined by a user.

As shown in FIG. 1F, the order robot 110 positions itself at the approximate desired distance 190 from the human 120. Once a human 120 has been detected, a control program can send commands to an actuator of the order robot 110. The actuator may comprise one or more of one or more wheels and a non-wheeled actuator. For example, the system may be configured so that the order robot 110 moves in the correct direction so as to maintain one or more of a substantially constant distance 190 from the human and a substantially constant orientation to the human.

For example, the desired distance 190 may be predetermined by a user. For example, the desired distance 190 may be calculated by the server 125. Alternatively, or additionally, following the information capture, the order robot 110 positions itself at an approximate robot position 186. For example, the robot position 186 is predetermined by a user. For example, the robot position 186 is calculated by the server 125.

The order robot 110 is configured to provide data to the server 125. For example, the order robot 110 is configured to provide logging data to the server 125. The data may comprise one or more of an order item pick time, an order item pick location, an image, a point cloud, two-dimensional data, three-dimensional data, a metric, and other data.

A metric may comprise one or more of a human moving speed, a human picking speed, and human health data. The order robot 110 may use the information capture device 180 to monitor the health of the human. For example, the order robot 110 may use the information capture device 180 to monitor one or more of human exhaustion, elevated human body temperature, and another human health indicator. If a human is having a medical issue, the order robot 110 may alert a supervisor through one or more of wireless communications and wired communications.

Figure 1G:
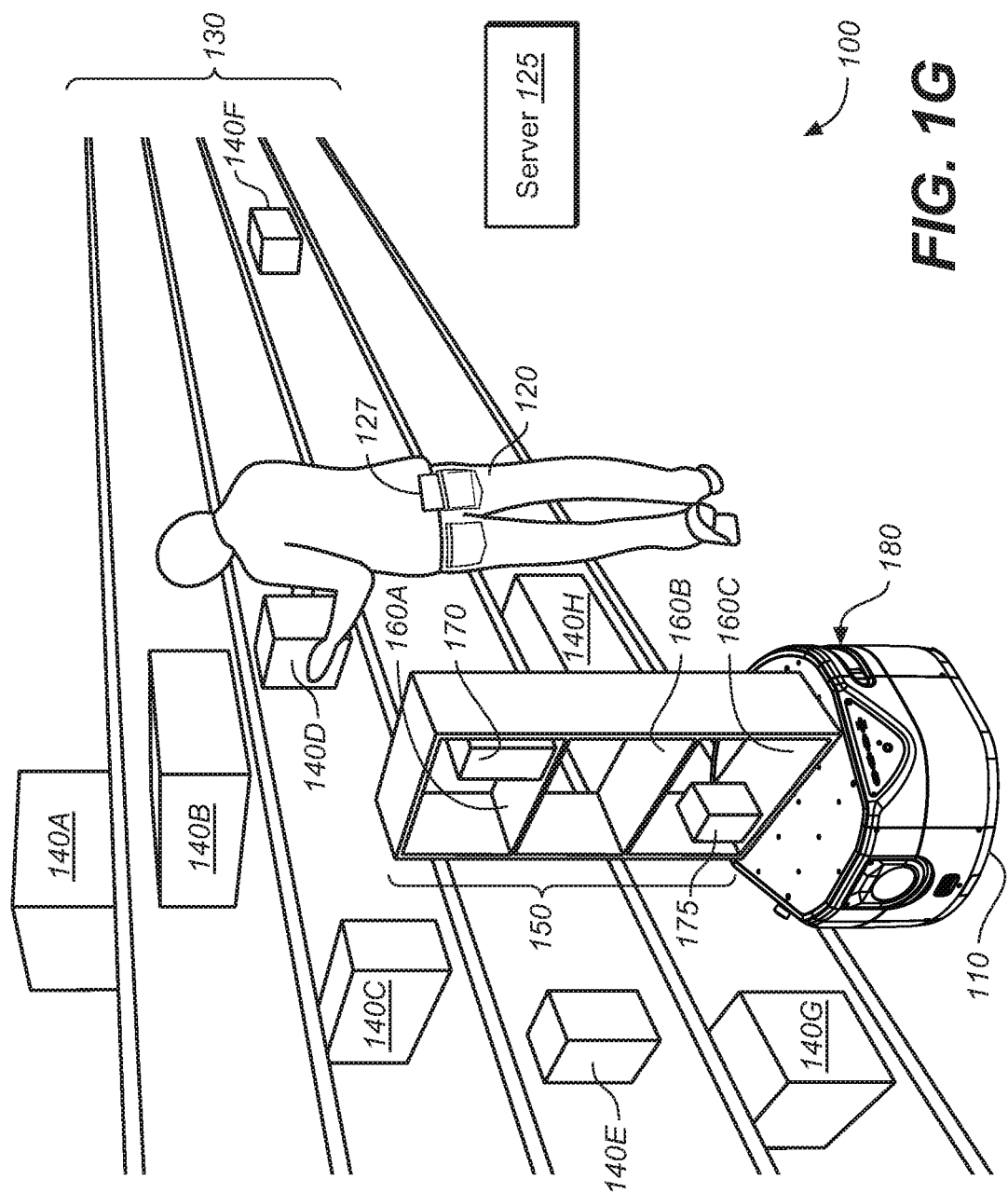

In FIG. 1G, the human 120 picks up the fourth order item 140D from the inventory storage 130. As depicted in FIG. 1G, the human-operated device 127 is carried in clothing of the human 120. As depicted, the human-operated device 127 is carried in a pocket comprised in pants worn by the human 120.

Figure 1H:
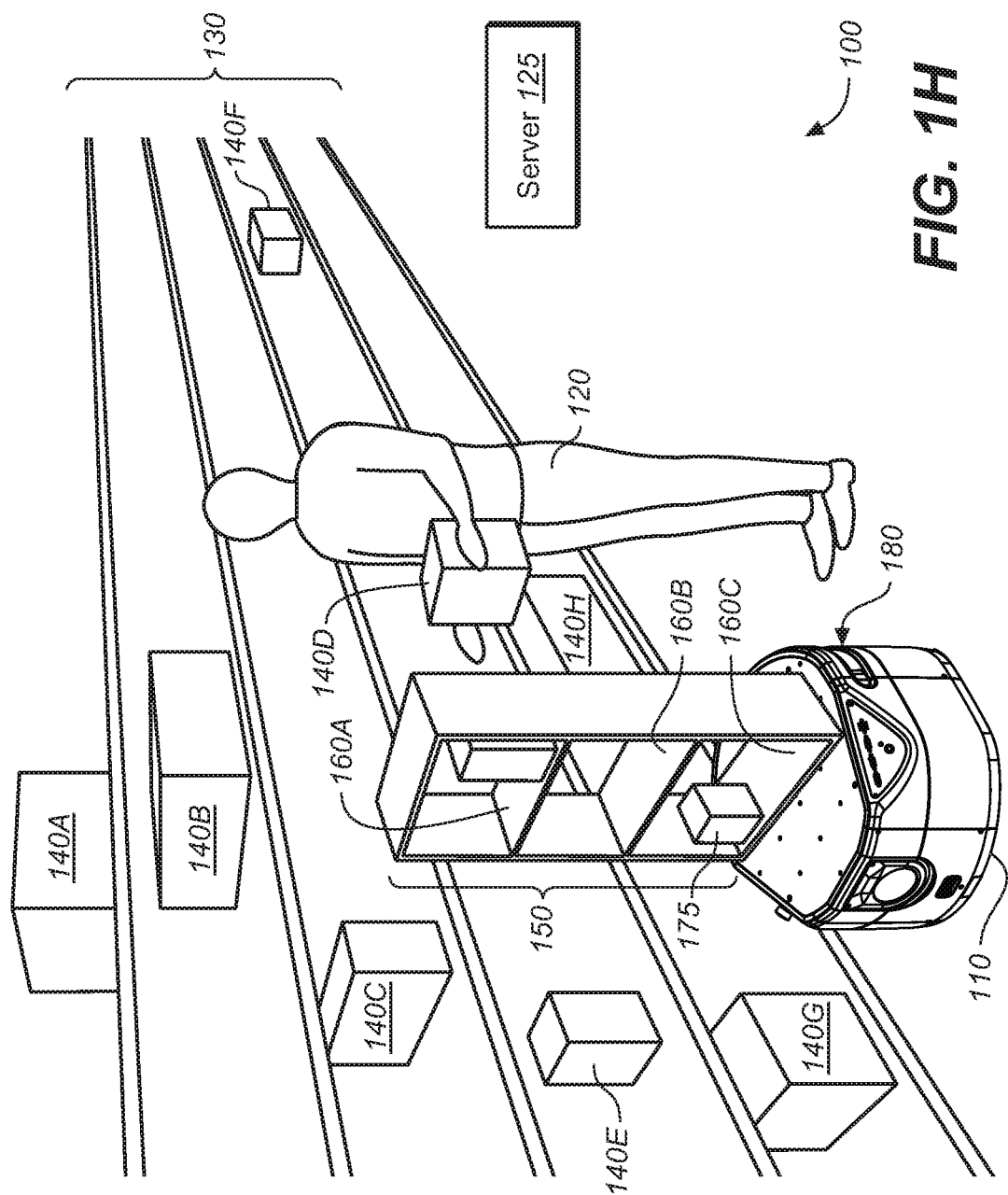

In FIG. 1H, the human 120 carries the fourth order item 140D toward the second order shelf 160B.

Figure 1I:
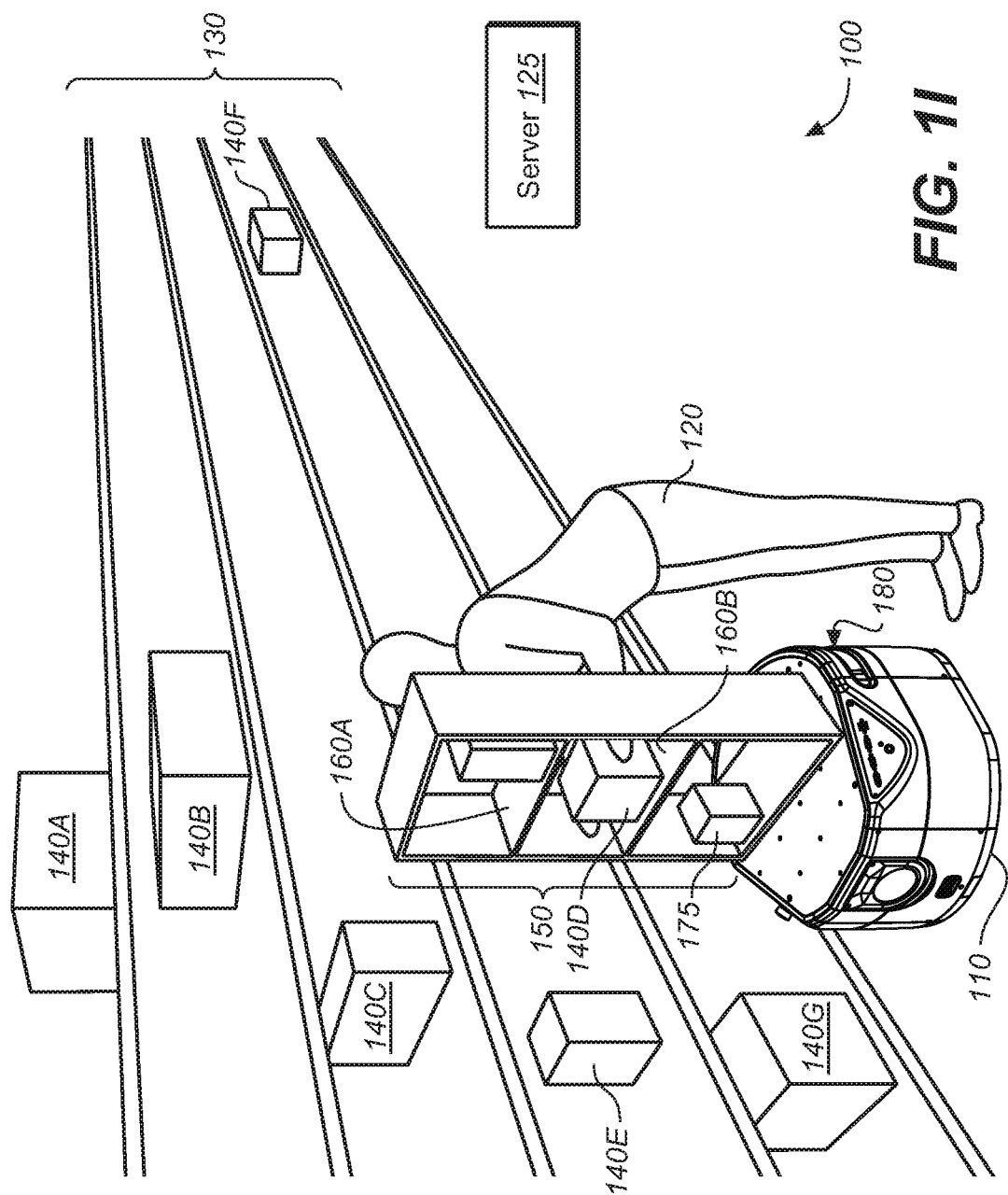

In FIG. 1I, the human 120 positions the fourth order item 140D on the second order shelf 160B. That is, the human 120 places the fourth order item 140D directly onto the order robot 110 so as to be accessible to the order robot 110.

Figure 1J:
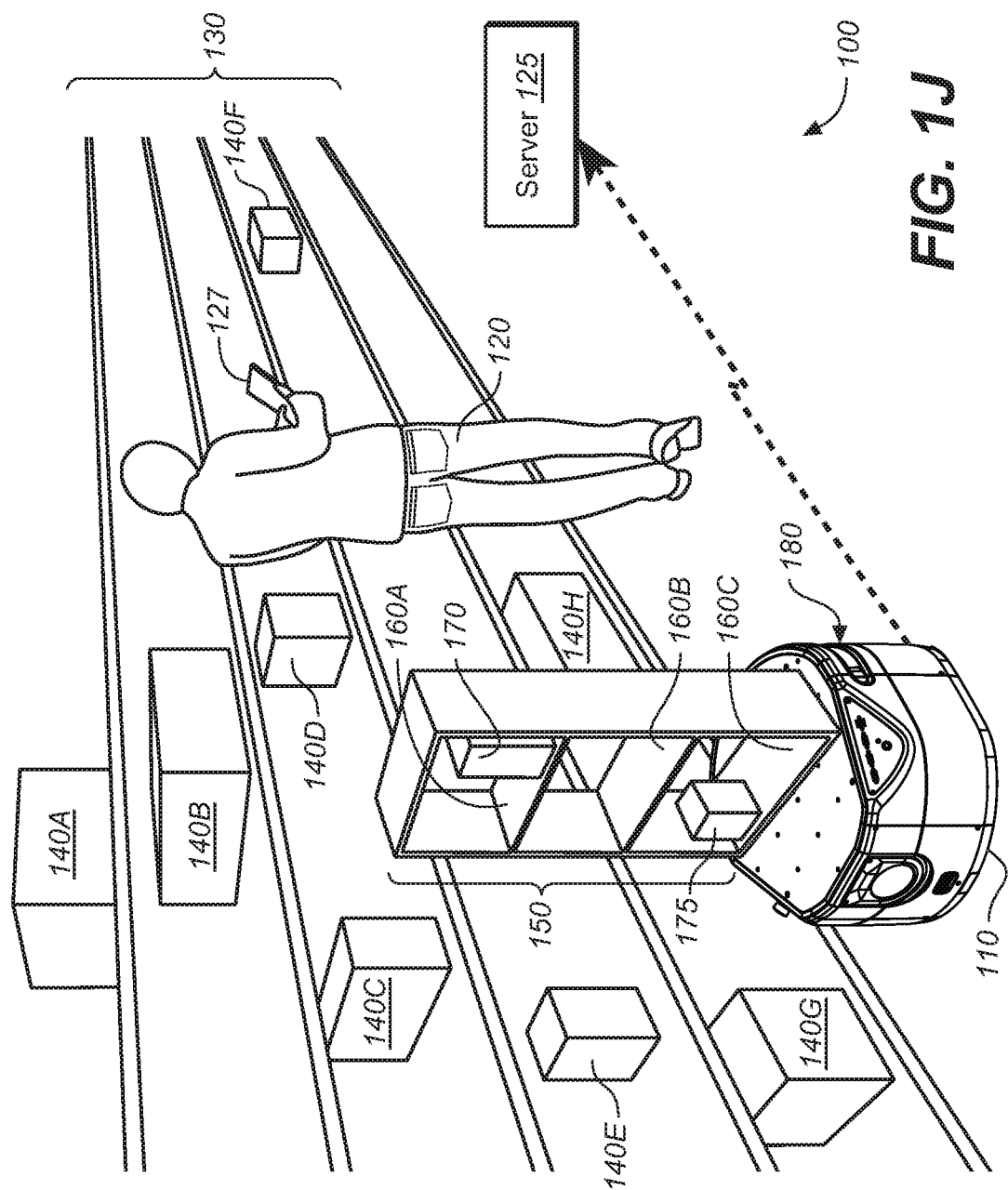

In FIG. 1J, the order robot 110 sends an order fulfillment confirmation to the server 125. Alternatively, the human-operated device 127 sends the order fulfillment confirmation to the server 125.

Figure 1K:
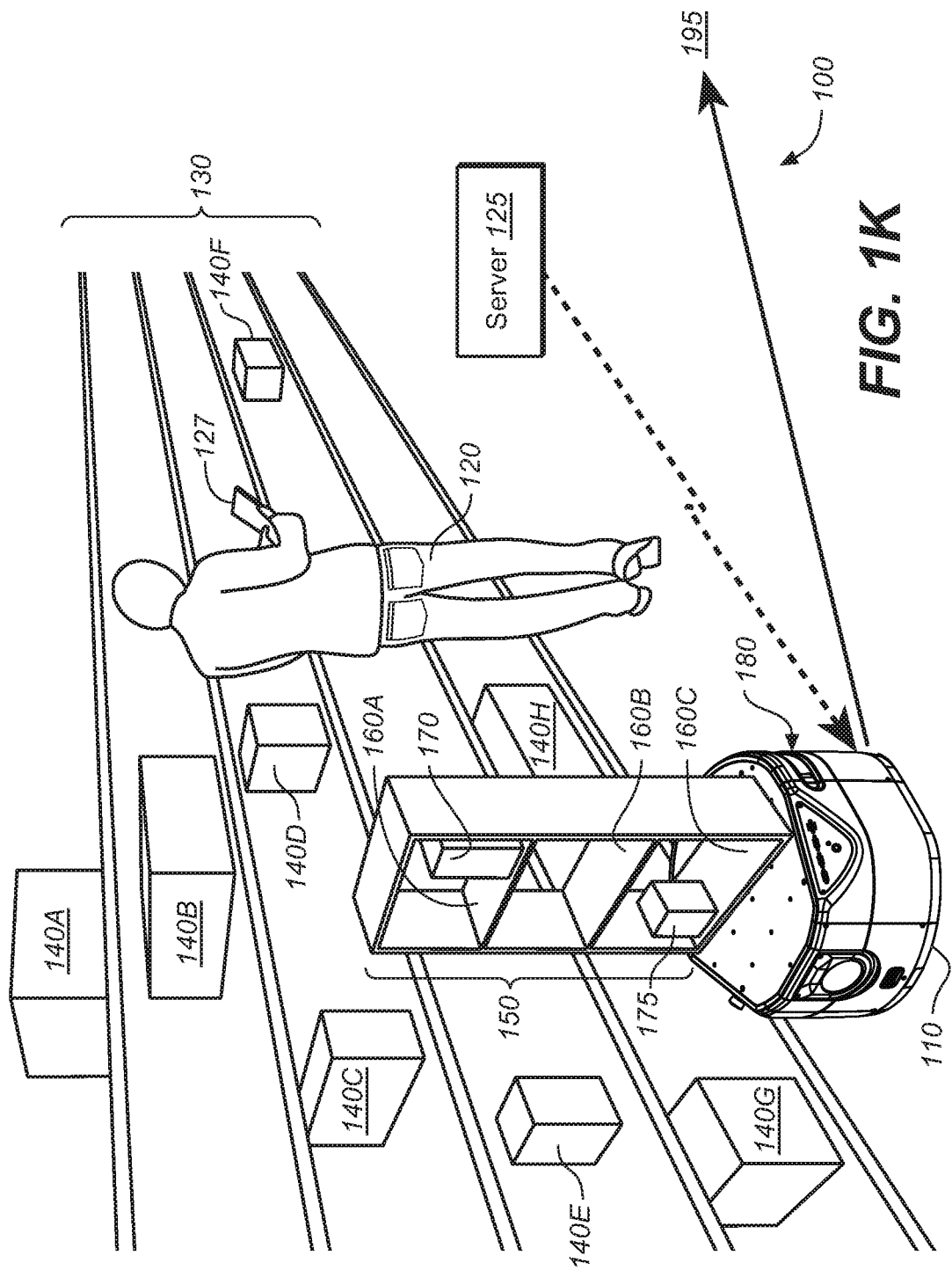

In FIG. 1K, the server 125 determines whether the order is nearly complete. Nearly complete may be defined based on a fixed number of order items 140A-140H remaining to be picked. For example, an order may be defined as nearly complete if three or fewer items 140A-140H remain to be picked in the order. Alternatively, or additionally, nearly complete may be defined based on a typical time required to pick remaining order items 140A-140H. For example, nearly complete may be defined based on the typical time required to pick the remaining order items 140A-140H using a pick metric. For example, the pick metric comprises an average transit time between the current inventory storage 130 and an anticipated next inventory storage 130. For example, the pick metric comprises a distance remaining to be traveled computed using a location of one or more order items 140A-140H to be picked.

If the server 125 determines that the order is not nearly complete, the server 125 transmits an order to one or more of the order robot 110 and the human-operated device 127 to order the picking of another order item 140A-140H.

If the server 125 determines that the order is nearly complete, the server queries if an order robot replacement 110A that is suitable for use for fulfilling a next order has yet been sent. Sending the order robot replacement 110A may be desirable to minimize delays in fulfilling the next order. If no order robot replacement 110A has been sent yet, the server 125 sends an order to the order robot replacement 110A ordering its dispatch. The order robot replacement 110A moves per the order it received from the server 125.

Then the server 125 determines whether the order is complete. If an order robot replacement 110A has already been sent, the server 125 determines whether the order is complete.

If the server 125 determines that the order is complete, as depicted, the server 125 instructs the order robot 110 to carry the order items 140A-140H to a final destination 195. The order robot 110 then heads off to the final destination 195 for offloading of the order items 140A-140H.

Process terminates or restarts using replacing robot 110b. Replacing robot may navigate to and follow current robot 110 that is following human 120.

FIGS. 2A-2D are a set of drawings that depict a sequence of events in a system using robots to assist humans in order fulfillment in which an order robot 110 leads one or more humans 120 as they pick one or more order items 140A-140H. As shown in FIGS. 2A-2D, according to alternative embodiments, the order robot 110 may lead the human, rather than following the human as shown in FIGS. 1A-1K. The control device is configured to determine one or more of the order item 140A-140H to pick and a location of the order item 140A-140H. The order robot 110 can navigate its way through the inventory storage 130 to the desired position. For example, the order robot 110 can automatically navigate its way through the inventory storage 130 to the desired position.

FIGS. 2A-2D depict a system 200 using robots to assist humans in order fulfillment in which the order robot 110 leads the human 120 as the human 120 picks one or more order items to fulfill an order. Other than the fact that the order robots 110 leads the human 120 in FIGS. 2A-2D, rather than following the human 120 as in FIGS. 1A-1K, the system 200 functions in a similar way to the system 100. For example, the system 200 comprises a warehouse 200. The order robot 110 may lead the human 120 as the human 120 picks one or more order items.

FIGS. 2A-2D also depict the inventory storage 130 comprising the first through eighth inventory items 140A-140H. Preferably, although not necessarily, the order robot 110 comprises a mobile order robot 110. Those of skill in the art will recognize that any number of order robots 110 may be present. Similarly, those of skill in the art will recognize that any number of humans 120 may be present.

Figure 2A:
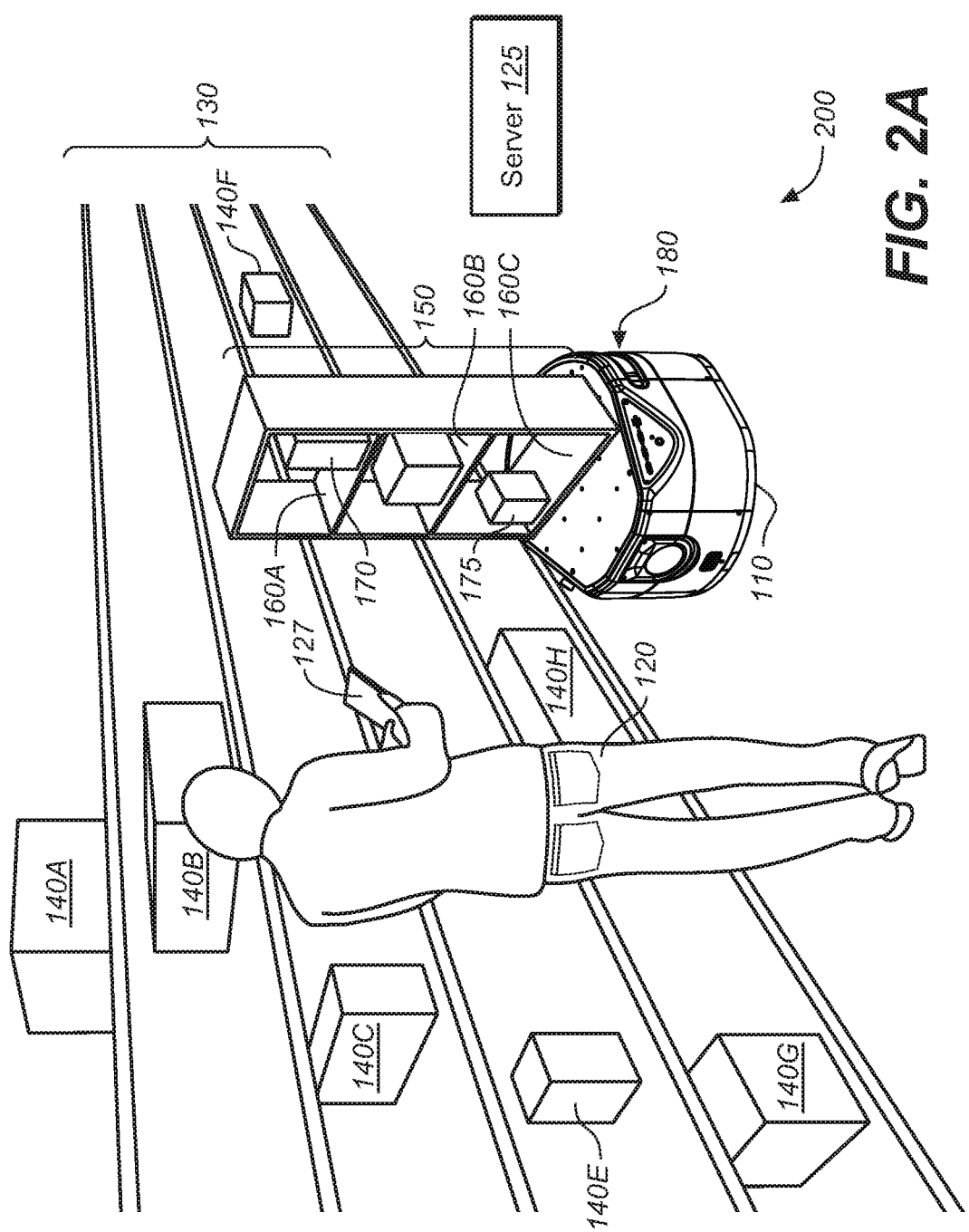
FIGS. 2A-2D are a set of drawings that depict a sequence of events in a system using robots to assist humans in order fulfillment which an order robot leads one or more humans as they pick one or more order items.

For example, as depicted in FIG. 2A, the order robot 110 comprises order storage 150. Order storage 150 comprises one or more of an order bin, an order shelf, and an order box. As depicted, the order storage 150 comprises three order shelves, a first order shelf 160A, a second order shelf 160B, and a third order shelf 160C. As depicted, the first order shelf 160A comprises a first order shelf order item 170. As depicted, the third order shelf 160C comprises a third order shelf order item 175.

Those of skill in the art will further recognize that the first order shelf 160A may hold an arbitrary number of first order shelf order items 170, the second order shelf 160B may hold an arbitrary number of second order shelf order items (not pictured), and the third order shelf 160C may hold an arbitrary number of third order shelf order items 175.

As depicted in FIG. 2A, the order robot 110 further comprises an information capture device 180.

Figure 2B:
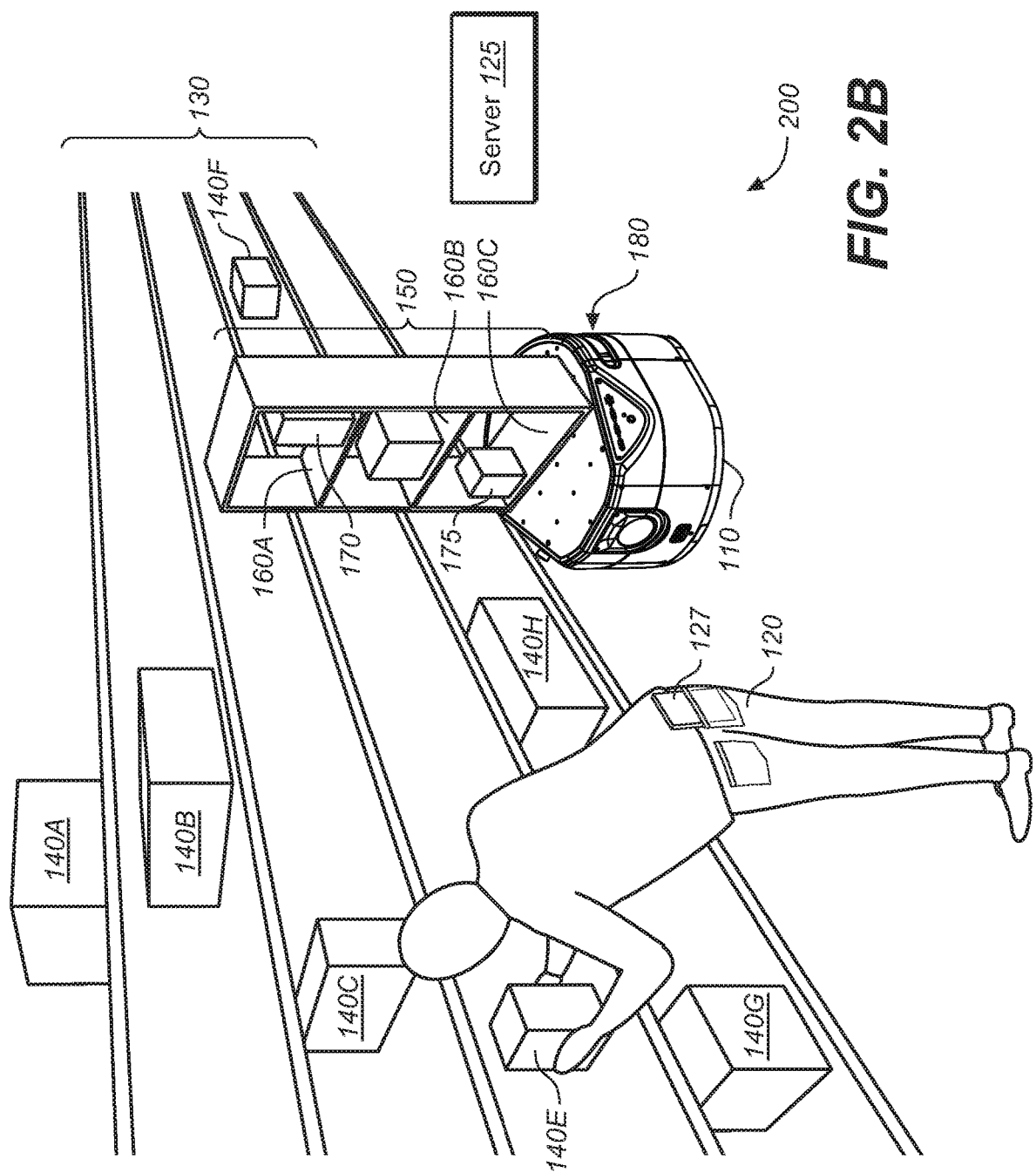

In FIG. 2B, the human 120 picks up the fifth order item 140E from the inventory storage 130.

Figure 2C:
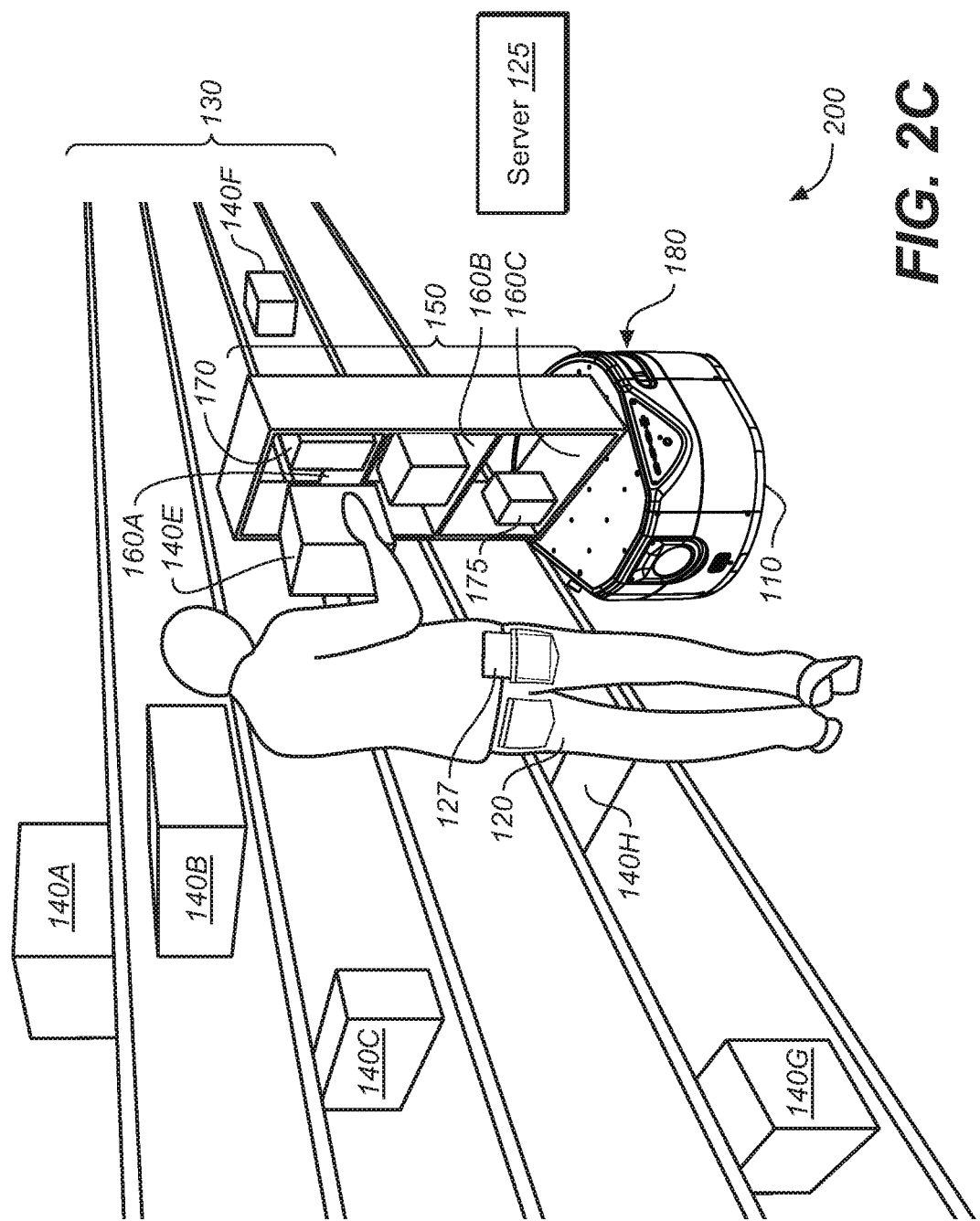

In FIG. 2C, the human 120 carries the fifth order item 140E toward the second order shelf 160B.

Figure 2D:
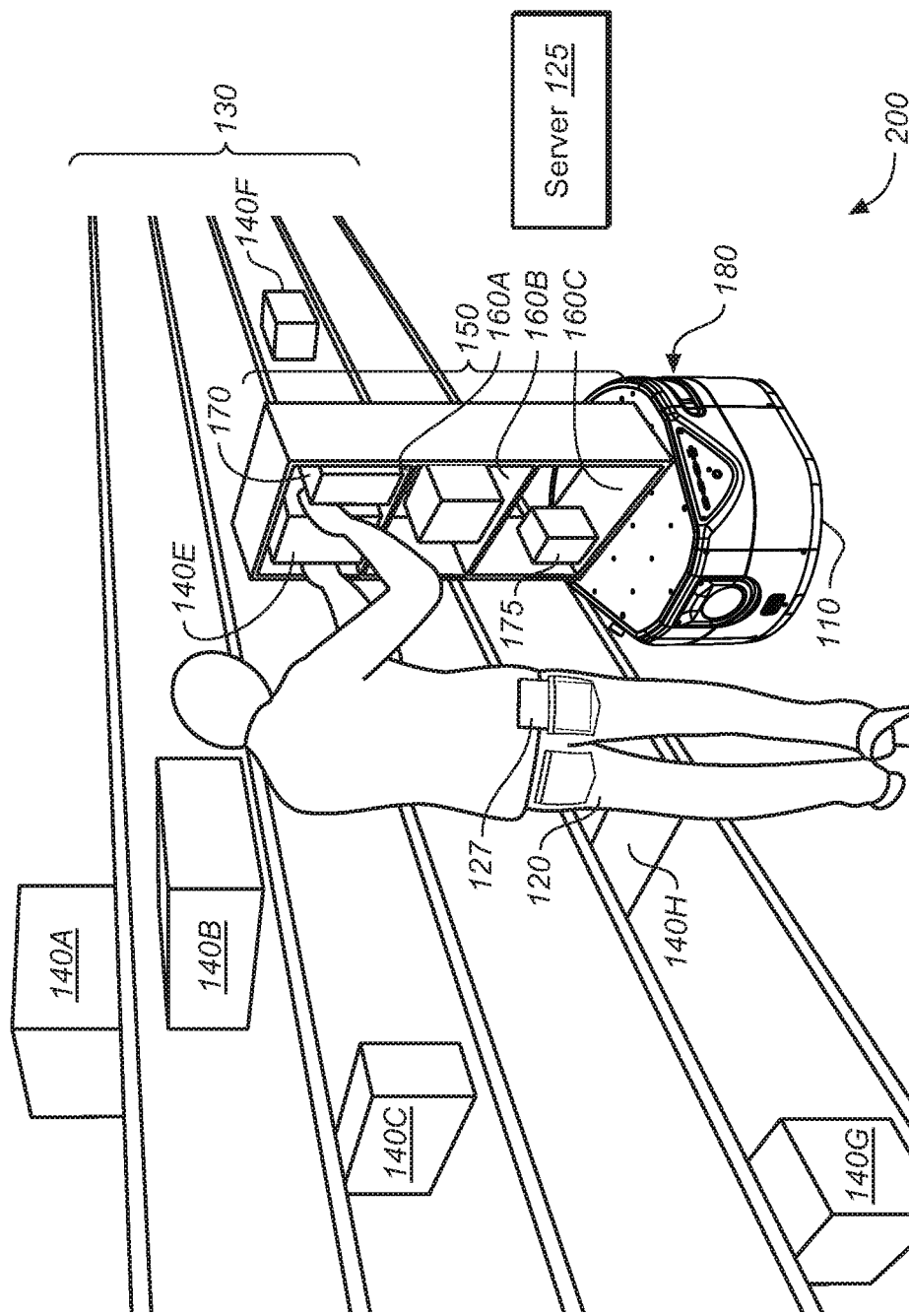

In FIG. 2D, the human positions the fifth order item 140E on the second order shelf 160B.

FIG. 3 is a drawing of a system 300 using robots to assist humans in order fulfillment showing that the following behavior of the order robot 110 may be initiated by a hit such as by lightly kicking a hit detection device comprised in the order robot 110. For example, the following behavior of the order robot may be initiated by a human 120 lightly kicking the order robot 110 on a designated panel. In this set of embodiments, the order robot 110 comprises a hit detection device. For example the hit detection device may comprise one or more of a designated panel, a gyro, an accelerometer, an inertial measurement unit (IMU), and another hit detection device. For example, sensor fusion between the information capture device 180 and the IMU can facilitate hit detection.

The assisting behavior of the order robot 110 may be initiated by one or more of a hit, a command, a microphone, a speech recognition system, a command from the server 125, a command from the human-operated device 127, and another assist trigger configured to trigger the order robot 110 to assist the human 120 to pick the order item.

The following behavior of the order robot 110 may be initiated by one or more of a hit, a heads-up display, a smart watch, a tablet, a command, a wireless device, a headset, a microphone, a speech recognition system, and another following behavior initiator. For example, one or more of a smart watch, a tablet, and the like may also be used to display one or more of the items to be picked.

For example, the command may comprise a spoken command. For example, the command may comprise a spoken command from a human. For example, the order robot 110 may comprise one or more of a microphone and a speech recognition system. For example, the human may be equipped with a headset configured to communicate with the order robot 110 without picking up one or more of ambient noise and robot noise. For example, the headset may be operably connected to the order robot 110. For example, the headset may be operably connected to the server 125. For example, the headset may be wirelessly connected to the order robot 110. For example, the headset may be wirelessly connected to the server 125.

As another example, the following behavior of the order robot 110 may be initiated by a heads-up display 127.

Figure 4:
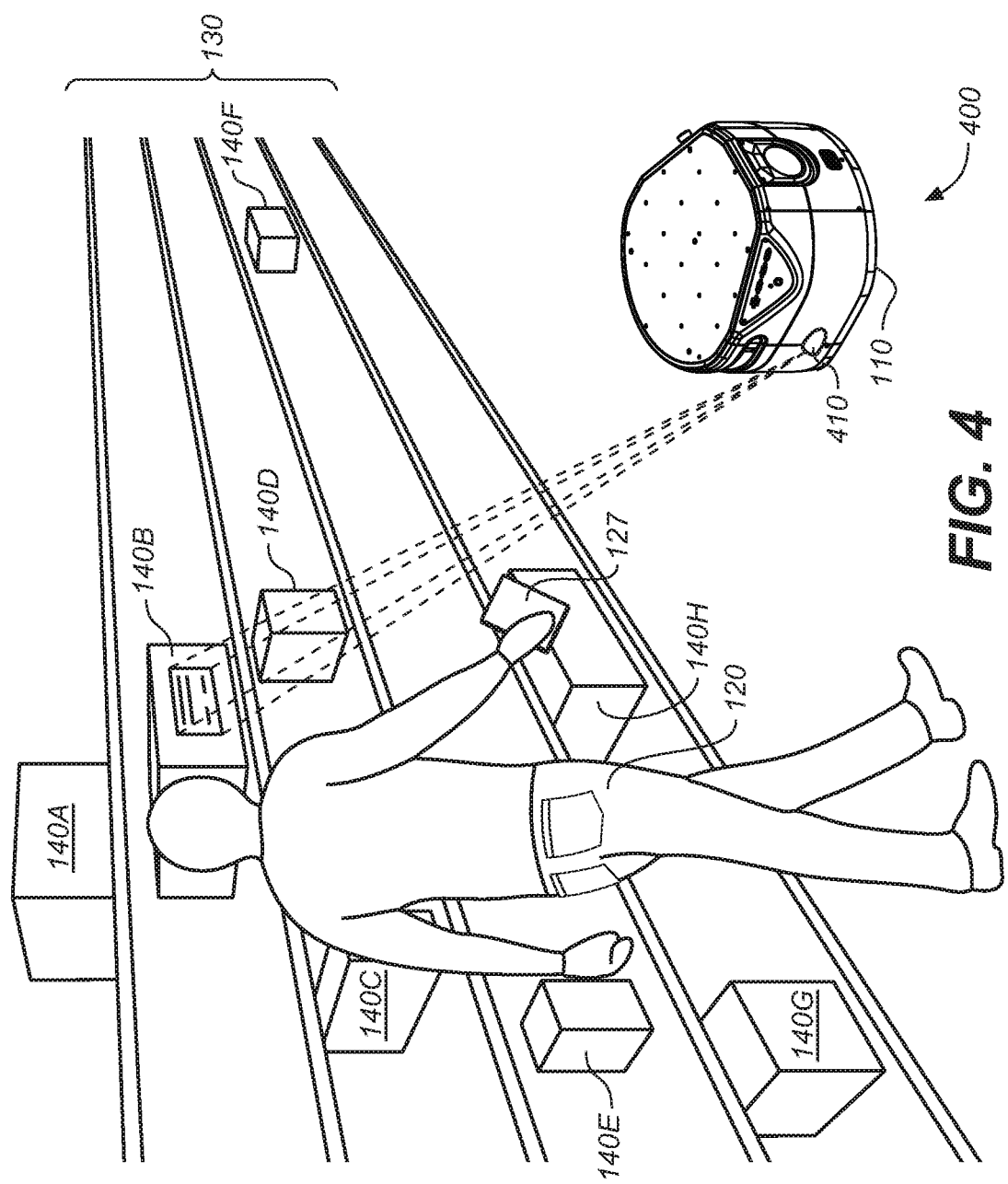

FIG. 4 is a drawing of a system 400 using robots to assist humans in order fulfillment illustrating that the order robot 110 can autonomously give the human 120 cues as to one or more of what to pick, where to pick, and the like. The human 120, guided by the human-operated device 127, picks from an inventory storage 130 one or more order items 140A-140H to fulfill an order.

The order robot 110 may use a projector 410 to project the cues onto one or more of the floor and another surface. As depicted, the projector 410 is indicating item 140B to be picked from the inventory storage 130 by the human 120, guided by the human-operated device 127. For example, the projector 410 comprises a pick-to-light illumination device. For example, the projector 410 comprises another projector 410 other than a pick-to-light illumination device.

According to these embodiments, the order robot 110 is the leader of the human 120, as depicted in FIGS. 2A-2D. The order robot 110 may suggest where the human 120 should go. For example, the order robot 110 may comprise lights (not shown) configured to show in which direction the order robot 110 will be heading.

The order robot 110 may adjust its pace to approximately match the pace of the human 120. For example, the order robot 110 may automatically adjust its pace to approximately match the pace of the human 120. For example, the order robot 110 may adjust its pace to approximately match the pace of the human 120 if the human 120 falls behind the order robot 110. For example, the order robot 110 may adjust its pace to approximately match the pace of the human 120 if the human 120 keeps up with the order robot 110.

According to further embodiments of the invention, the order robot 110 may comprise a cuing device. The cuing device may comprise one or more of a visual cuing device and an audio cuing device. The visual cuing device may comprise one or more of an onboard projector, a camera system, an augmented reality system, a laser pointer, a light-emitting diode (LED) light, and another visual cuing device that can show the human what to pick. The visual cuing device is configured to display one or more visual cues to the human regarding one or more order items to pick. The visual cuing device may also be configured to record evidence of one or more of the picking of the one or more order items and the placement of the one or more order items so as to be accessible to the order robot 110. The audio cuing device is configured to specify the task to the human. The audio cuing device may comprise one or more of an on-robot speaker and a headset. The headset may, for example, be wirelessly connected to the order robot 110. Alternatively, a wired connection may connect the headset and the order robot 110. As another alternative, the order robot 110 can wirelessly communicate with the server, and the server can wirelessly communicate with the headset.

Figure 5:
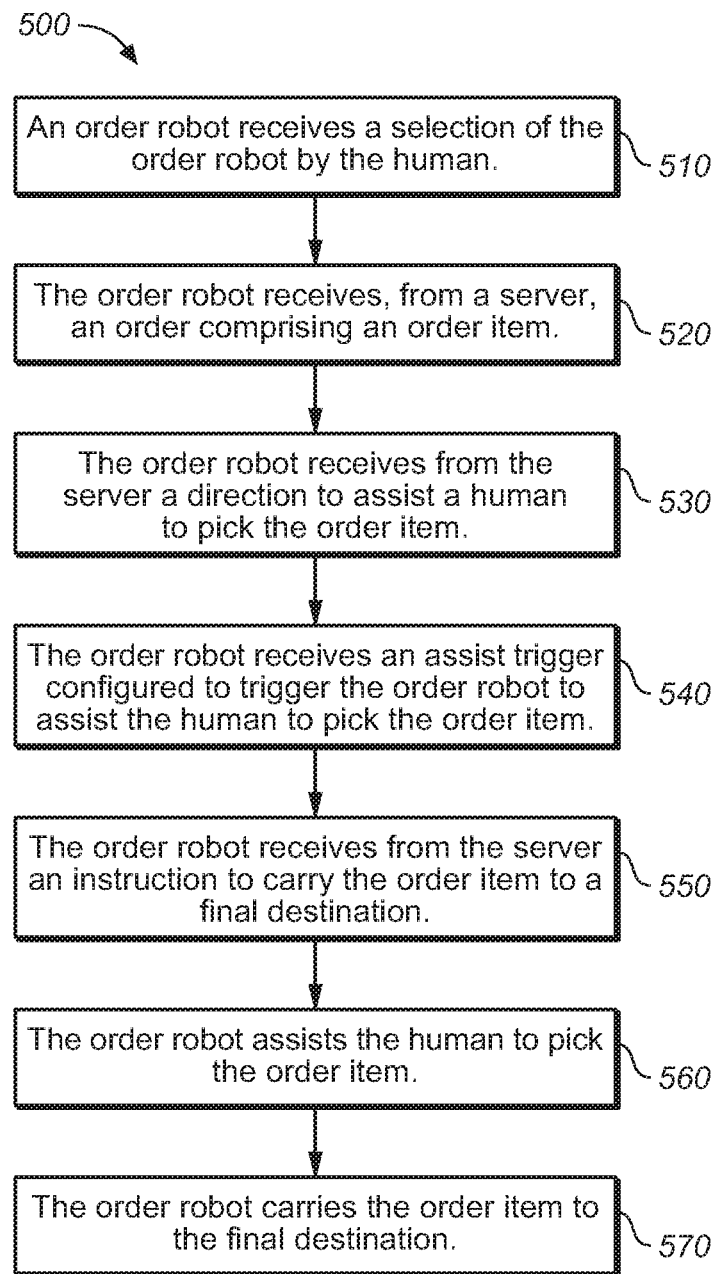
FIG. 5 is a flowchart of a method 500 for order fulfillment using robots to assist humans.

FIG. 5 is a flowchart of a method 500 for order fulfillment using robots to assist humans. The order of the steps in the method 500 is not constrained to that shown in FIG. 5 or described in the following discussion. Several of the steps could occur in a different order without affecting the final result.

In step 510, an order robot receives a selection of the order robot by a human. Block 510 then transfers control to block 520.

In step 520, the order robot receives, from a server, an order comprising an order item. Block 520 then transfers control to block 530.

In step 530, the order robot receives from the server a direction to assist the human to pick the order item. Block 530 then transfers control to block 540.

In step 540, the order robot receives an assist trigger configured to trigger the order robot to assist the human to pick the order item. Block 540 then transfers control to block 550.

In step 550, the order robot receives from the server an instruction to carry the order item to a final destination. Block 550 then transfers control to block 560.

In step 560, the order robot assists the human to pick the order item. Block 560 then transfers control to block 570.

In step 570, the order robot carries the order item to the final destination. Block 570 then terminates the process.

Figure 6:
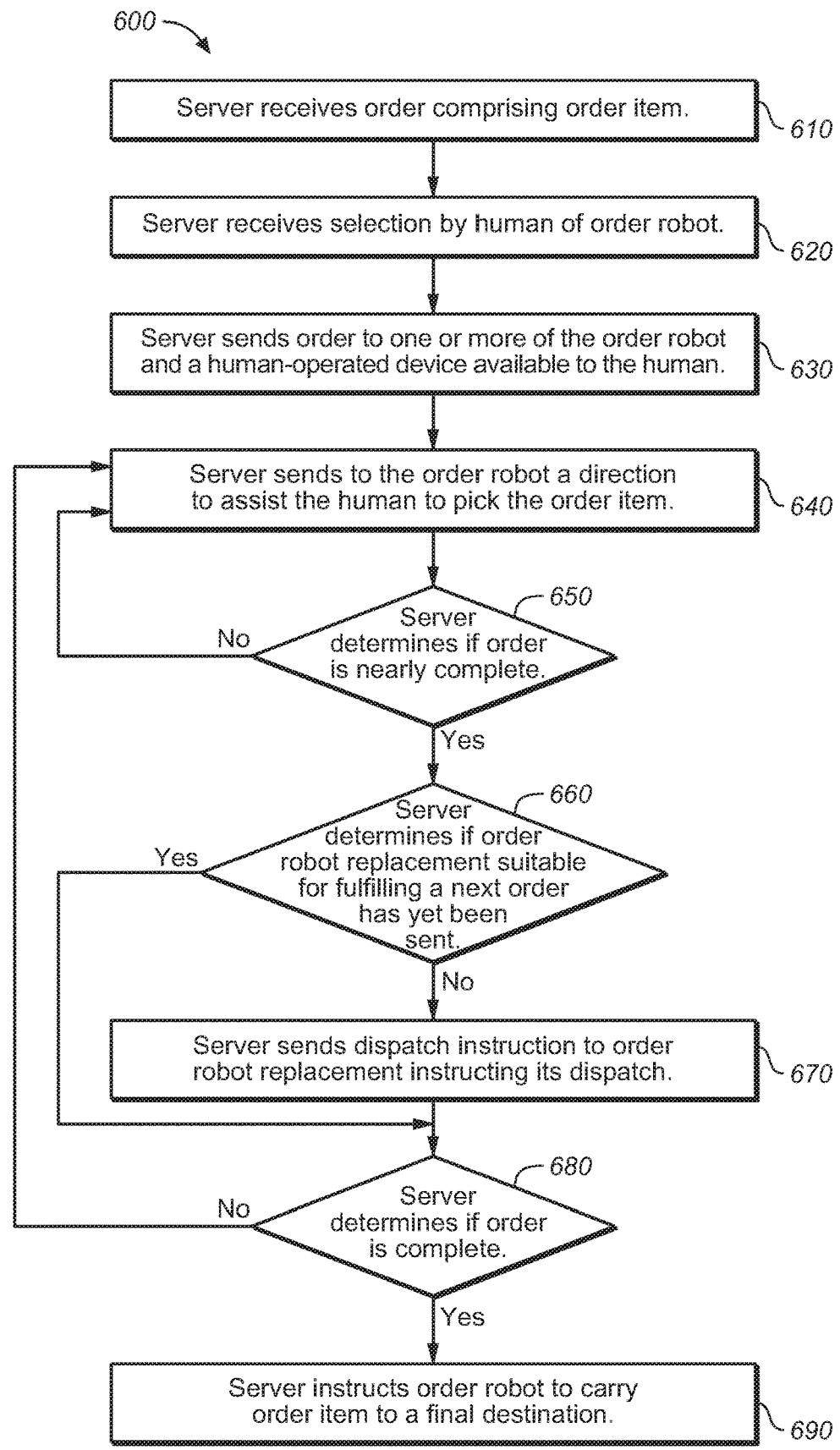
FIG. 6 is a flowchart of a method 600 for order fulfillment using robots to assist humans.

FIG. 6 is a flowchart of a method 600 for order fulfillment using robots to assist humans. The order of the steps in the method 600 is not constrained to that shown in FIG. 6 or described in the following discussion. Several of the steps could occur in a different order without affecting the final result.

In step 610, a server receives an order comprising an order item. Block 610 then transfers control to block 620.

In step 620, the server receives a selection by the human of the order robot. Block 620 then transfers control to block 630.

In step 630, the server sends the order to one or more of the order robot and a human-operated device available to the human. Block 630 then transfers control to block 640.

In step 640, the server sends to the order robot a direction to assist the human to pick the order item. Block 640 then transfers control to block 650.

In step 650, the server determines if the order is nearly complete. If the order is determined to be nearly complete, block 650 then transfers control to block 660. If the order is not nearly complete, the process reverts to block 640.

In step 660, the server determines if an order robot replacement suitable for fulfilling a next order has yet been sent. If the order robot replacement has not yet been sent, block 660 then transfers control to block 670. If the order robot replacement has already been sent, block 660 then transfers control to block 680.

In step 670, the server sends a dispatch instruction to the order robot replacement instructing its dispatch. Block 670 then transfers control to block 680.

In step 680, the server determines if the order is complete. If the order is complete, block 680 then transfers control to block 690. If the order is not complete, the process reverts to block 640.

In step 690, the server instructs the order robot to carry the order item to a final destination. Block 690 then terminates the process.

For example, it will be understood by those skilled in the art that software used by the system and method for order fulfillment and inventory management using robots may be located in any location in which it may be accessed by the system. It will be further understood by those of skill in the art that the number of variations of the network, location of the software, interactions of robots and humans, and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention. For example, the one or more shelves may be located within the order robot rather than on top of the order robot.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A method using one or more robots to assist a human in order fulfillment, comprising:
   receiving, by a server, an order comprising an order item;
   receiving, by the server, a selection by the human of the order robot;
   sending the order, by the server, to one or more of an order robot and a human-operated device available to the human;
   sending, by the server, to the order robot, a direction to assist the human to pick the order item;
   determining, by the server, that the order is nearly complete;
   determining, by the server, that an order robot replacement suitable for fulfilling a next order has not yet been sent;
   sending a dispatch instruction, by the server, to the order robot replacement instructing its dispatch;
   determining, by the server, that the order is complete; and
   instructing the order robot, by the server, to carry the order item to a final destination.

2. The method of claim 1, wherein the step of sending the direction comprises sending a direction to assist the human to pick the order item from inventory items comprised in inventory storage.

3. The method of claim 1, wherein the step of receiving the selection comprises receiving the selection from the order robot.

4. The method of claim 1, wherein the step of receiving the selection comprises receiving the selection from the human-operated device.

5. The method of claim 4, further comprising a step, performed after the step of receiving the selection and before the step of sending the order, of sending the selection, by the server, to the order robot.

6. The method of claim 1, further comprising a step, performed after the step of sending the order and before the step of determining that the order is nearly complete, of:
   receiving, by the server, from the order robot, a pick list comprising one or more order items to be picked.

7. The method of claim 1, wherein the step of instructing comprises a sub-step of:
   determining one or more of the order item and a location of the order item.

8. The method of claim 1, further comprising a step, performed after the step of sending the order and before the step of determining that the order is complete, of:
   sending, by the server, to the order robot, an assist trigger configured to trigger the order robot to assist the human to pick the order item.

9. The system of claim 1, wherein the human-operated device is configured to assist the human to perform one or more of locating the order item, grasping the order item, and placing the order item so as to be accessible to the order robot.

10. The system of claim 1, wherein the order robot is mobile.

11. The system of claim 1, wherein assisting comprises leading the human.

12. The system of claim 1, wherein assisting comprises following the human.

13. The system of claim 1, wherein the order robot comprises an information capture device configured to make an information capture.

14. The system of claim 13, wherein the information capture is usable to perform one or more of detecting a human location and tracking motion of the human.

15. The system of claim 13, wherein the information capture comprises a pick list comprising one or more order items to be picked.

16. The system of claim 1, wherein the order robot is configured to provide data to the server.

17. The system of claim 16, wherein the data comprises one or more of an order item pick time, an order item pick location, an image, a point cloud, two-dimensional data, three-dimensional data, a metric, and other data.

18. The system of claim 17, wherein the metric comprises one or more of a human moving speed, a human picking speed, and human health data.

19. The system of claim 18, wherein the human health data comprises one or more of human exhaustion, elevated human body temperature, and another human health datum.

20. The method of claim 1, further comprising a step, performed before the step of instructing the order robot, of receiving, by the server, from the order robot, an order fulfillment confirmation.

* * * * *